United States Patent [19]

Lindee

[11] Patent Number: 5,022,888
[45] Date of Patent: Jun. 11, 1991

[54] CO-FORMING APPARATUS FOR FOOD PATTY MOLDING MACHINE

[75] Inventor: Scott A. Lindee, New Lenox, Ill.

[73] Assignee: Formax, Inc., Mokena, Ill.

[21] Appl. No.: 518,480

[22] Filed: May 3, 1990

[51] Int. Cl.⁵ .............................................. A22C 7/00
[52] U.S. Cl. .................................... 452/174; 425/556
[58] Field of Search ............... 452/174; 425/556, 377, 425/382 R; 426/513

[56] References Cited

U.S. PATENT DOCUMENTS

| Re. 30,096 | 9/1979 | Richards et al. ..................... 425/562 |
|---|---|---|
| 2,635,561 | 4/1953 | Elaesser . |
| 3,104,976 | 9/1963 | Tolley . |
| 3,473,489 | 10/1969 | Sargent . |
| 3,679,338 | 7/1972 | Lutz ..................................... 425/131 |
| 3,939,530 | 4/1976 | Holly . |
| 3,940,217 | 2/1976 | McCarthy et al. ................... 425/98 |
| 4,054,967 | 10/1977 | Sandberg et al. .................... 426/512 |
| 4,106,162 | 8/1978 | Fournier ............................... 425/298 |
| 4,162,333 | 7/1979 | Nelson et al. ........................ 426/283 |
| 4,182,003 | 1/1980 | LaMartino et al. ................. 425/556 |
| 4,272,864 | 6/1981 | Holly . |
| 4,317,259 | 3/1982 | Wagner . |
| 4,356,595 | 11/1982 | Sandberg et al. .................... 426/512 |
| 4,697,308 | 10/1987 | Sandberg ............................. 425/556 |
| 4,748,031 | 5/1988 | Koppa ................................. 426/283 |
| 4,768,260 | 9/1988 | Sandberg ............................. 425/556 |

Primary Examiner—Willis Little
Attorney, Agent, or Firm—Kinzer, Plyer, Dorn, McEachran & Jambor

[57] ABSTRACT

A co-forming apparatus for molding dual-ingredient food patties in a molding machine of the kind having a mold plate disposed intermediate two mold covers and driven cyclically between a fill position and a discharge position; first and second food ingredients are pumped through first and second fill passages, in one or both mold covers, into separate parts of a mold cavity in the mold plate when that plate is in its fill position. A tubular separator piston in the second fill passage moves into and out of the mold cavity, in synchronism with the cyclic mold plate movement, to maintain separation between the first and second parts of the mold cavity during filling.

17 Claims, 4 Drawing Sheets

CO-FORMING APPARATUS FOR FOOD PATTY MOLDING MACHINE

BACKGROUND OF THE INVENTION

There has been appreciable interest in production of molded food patties having two ingredients; the patty is usually formed as a relatively large ring of a first ingredient encompassing an appreciably smaller center portion of a second ingredient. Typical products of this kind utilize chicken for the main outer ingredient, with cheese or stuffing for the second ingredient. A variety of other similar products are possible, including the combination of fish with crab or other stuffing as the other ingredient, and beef or other meat with a second ingredient at the center of the molded food patty.

There are a number of high efficiency, high volume food patty molding machines that have been utilized for production of hamburger patties, other ground meat patties, chicken patties, fish patties, imitation steaks, and other molded food products. Three such machines that are commercially available are described in Richards et al. U.S. Pat. No. Re. 30,096, Sandberg et al. U.S. Pat. No. 4,054,967, and LaMartino et al. U.S. Pat. No. 4,182,003; these machines are available as the F-26, F-19, and F-12 food patty molding machines, respectively, made and sold by Formax Inc. of Mokena, IL, U.S.A. A more recently introduced, smaller food patty molding machine, one that is quite flexible in its operation, is described in Sandberg U.S. Pat. No. 4,768,260; the machine of that patent is available from Formax Inc. as its F-6 machine.

All of these high volume food patty molding machines are relatively flexible and each can produce a wide variety of food patties, depending upon the mold plate configuration and other mold station components in the machine. However, these machines have not been utilized for the manufacture of dual-ingredient molded food patties. This applies also to other food patty molding machines that, like the machines identified above, use a reciprocating mold plate with mold cavities which, in the fill position for the mold plate, are sealed off by mold covers on opposite sides of the mold plate. Thus, these high efficiency food patty molding machines have not heretofore been available for production of dual-ingredient food patties, particularly where one ingredient is to be disposed within the other within a cavity in the reciprocating mold plate.

SUMMARY OF THE INVENTION

It is a principal object of the present invention, therefore, to provide a new and improved co-forming apparatus for the molding station of a food patty molding machine of the kind utilizing a mold plate moving between fill and discharge positions, capable of effective, efficient, high volume production of dual-ingredient food patties with one ingredient nested within the other.

Another object of the invention is to provide a new and improved co-forming apparatus, for conversion of the molding station of a reciprocating mold plate food patty molding machine to the manufacture of dual-ingredient food patties that is effectively applicable to any of the molding machines identified above and that can be utilized in conjunction with a wide variety of different food ingredients.

A specific object of the invention is to provide a new and improved co-forming apparatus for the molding station of a food patty molding machine of the reciprocating mold plate type, effective to convert that machine to the production of dual-ingredient molded food products, that is simple and inexpensive in construction ye efficient and long-lasting in operation.

Accordingly, the invention relates to co-forming apparatus for a food patty molding machine of the kind comprising a mold plate, including a mold cavity, that is movable along a given path between a fill position, in which the opposite sides of the mold cavity are covered by first and second mold covers, and a discharge position, in which the mold cavity is clear of the mold covers; the machine further comprises mold plate drive means for cyclically driving the mold plate between its fill and discharge positions, a first fill passage, through one of the mold covers, aligned with the mold cavity fill position, and first pump means for pumping a first food ingredient through the first fill passage into a first part of the mold cavity. The co-forming apparatus comprises a second fill passage, through one of the mold covers, aligned with the mold cavity fill position, second pump means for pumping a second food ingredient through the second fill passage into a second part of the mold cavity, a tubular separator member movably mounted in the second fill passage, and separator drive means for driving the separator member between a separator fill position in which the separator extends into the mold cavity at its fill position to separate the second part of the mold cavity from the first part, and a separator discharge position in which the separator member is clear of the mold plate.

BRIEF DESCRIPTION OF THE DRAWINGS

FIG. 5 is a plan view, on an enlarged scale of a dual ingredient food patty made in the apparatus of FIGS. 1-4.

DESCRIPTION OF THE PREFERRED EMBODIMENT

Figure 1:
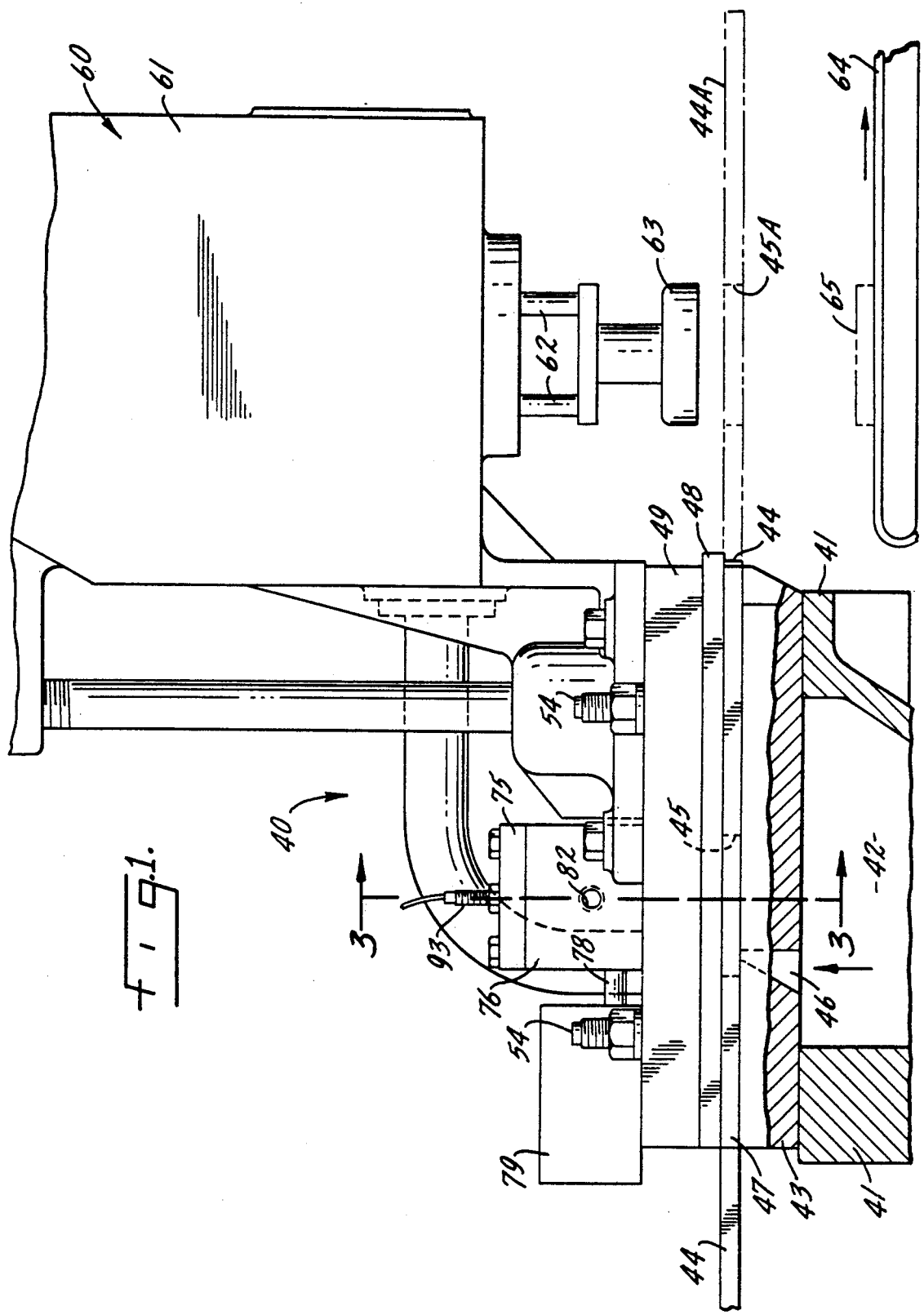
FIG. 1 is a side elevation view of the molding station of a food patty molding machine in which co-forming apparatus according to a preferred embodiment of the invention has been incorporated.
Figure 2:
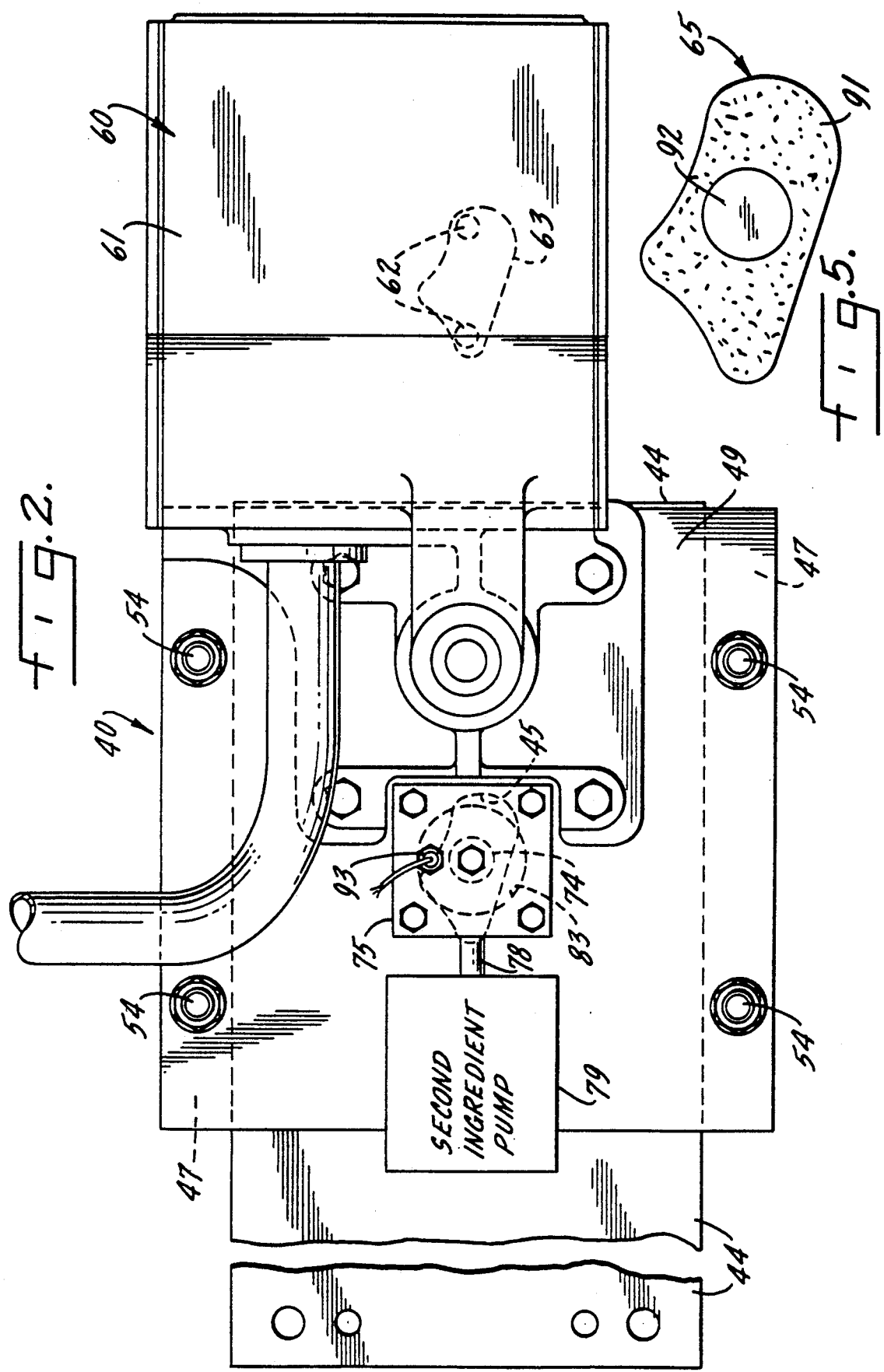
FIG. 2 is a plan view of the food patty molding station of FIG. 1.
Figure 3:
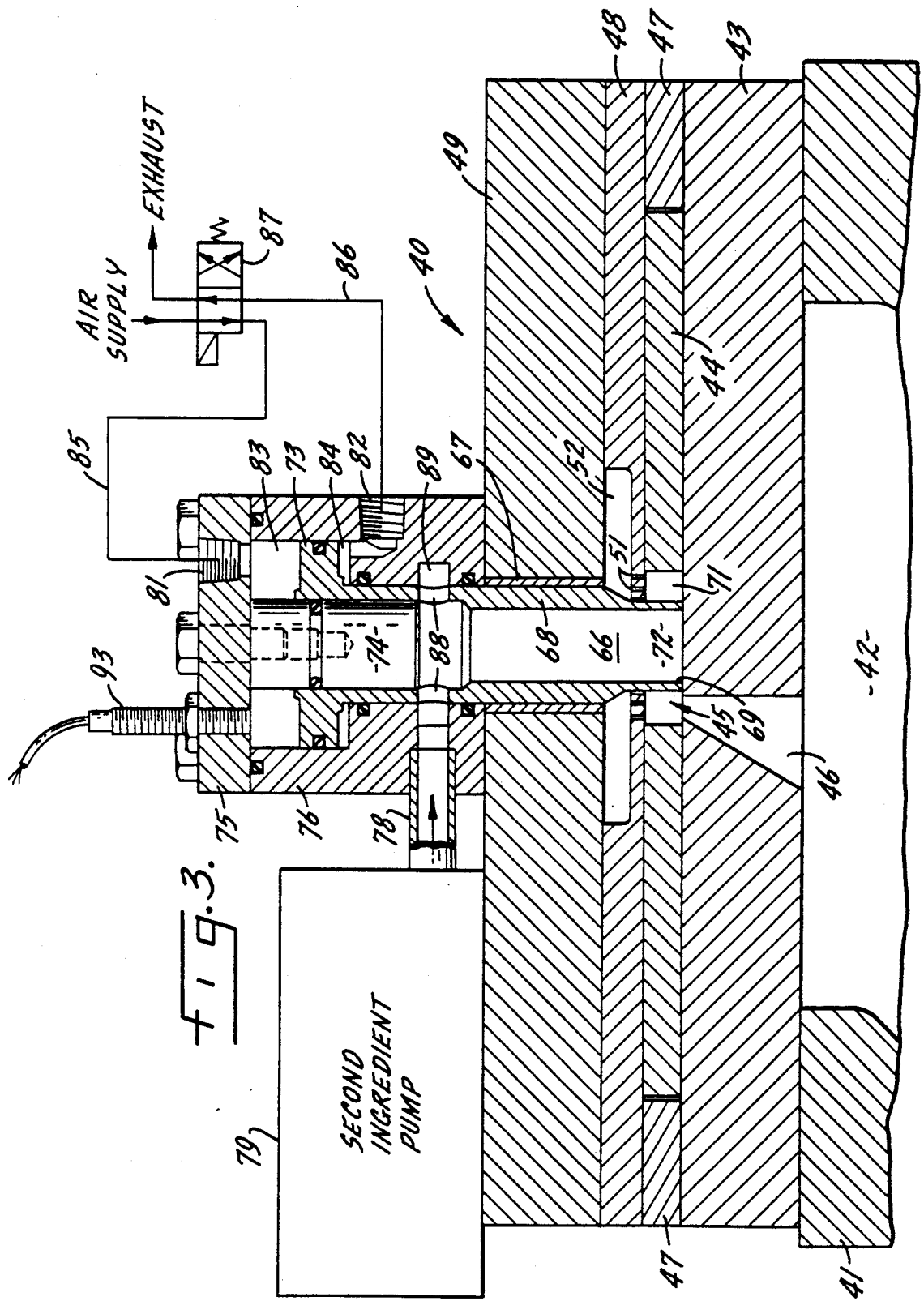
FIG. 3 is a sectional view taken approximately as indicated by line 3—3 in FIG. 1 with the mold plate in its fill position.
Figure 4:
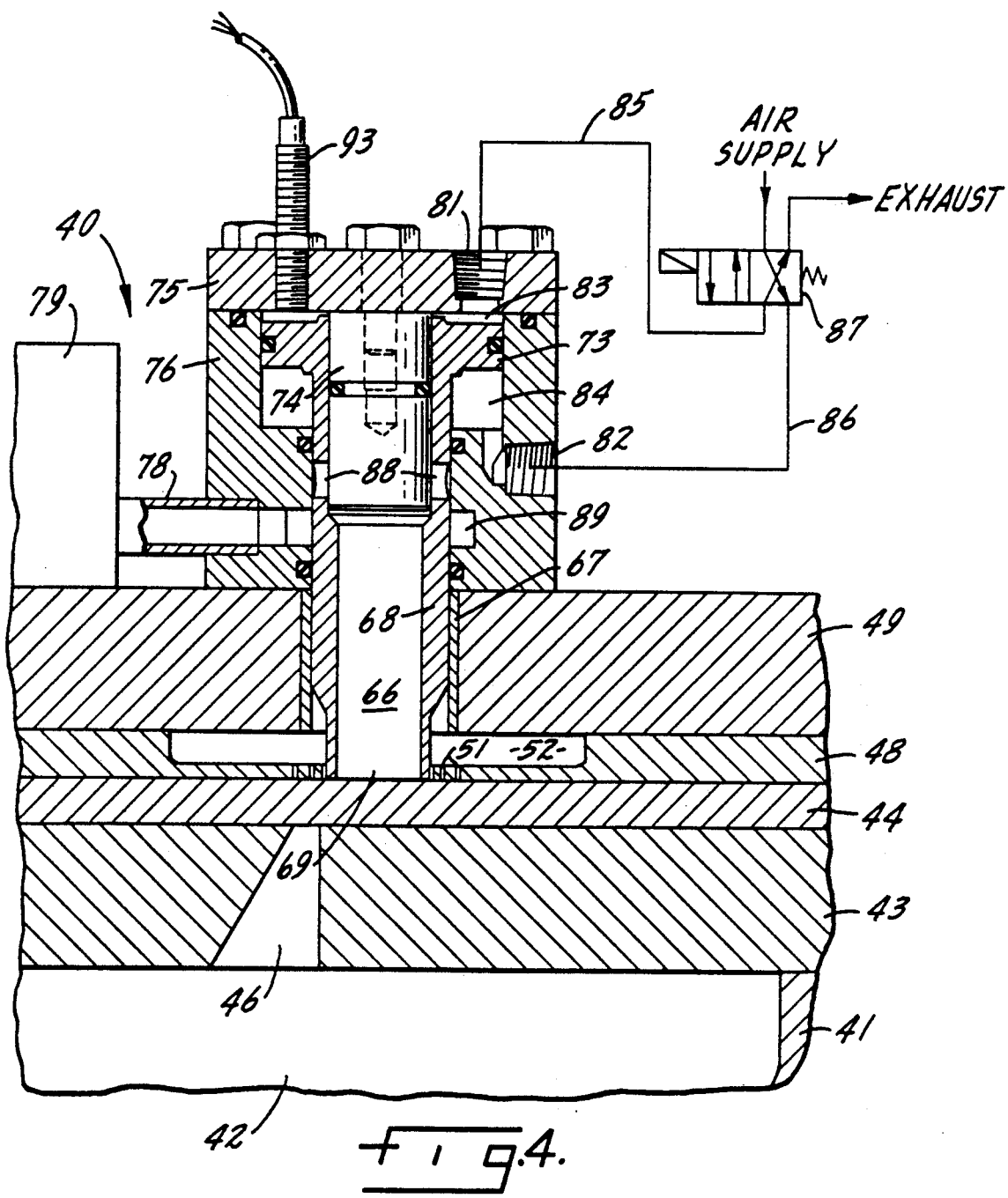
FIG. 4 is a detail sectional view like FIG. 3 but with the mold plate in its discharge position.

FIGS. 1 and 2 each illustrate the molding station 40 of a food product molding machine of the kind that utilizes a reciprocating mold plate. FIGS. 3 and 4 provide sectional views of molding station 40 for the two principal mold plate positions. Molding station 40 is a part of a complete molding machine of the kind described in substantially greater detail in Sandberg U.S. Pat. No. 4,768,260, a machine that is commercially available as the F-6 food patty molding machine of Formax Inc., Mokena, IL, U.S.A. It should be understood, however, that the co-forming apparatus of the invention can be applied to other reciprocating mold plate food patty machine, particularly those identified above.

Molding station 40 includes a pump housing 41, FIGS. 1 and 3, enclosing a main pump chamber 42. A lower cover plate 43 is mounted on top of housing 41. The lower cover plate 43, sometimes referred to as a fill plate, supports a mold plate 44 (FIGS. 1-4) that includes a mold cavity 45; the mold cavity 45 extends through mold plate 44 as shown in FIGS. 1 and 3. Mold cavity 45 need not be circular, square, or otherwise regular in its outline configuration; see the mold cavity shape in FIG. 2.

A first fill passage 46 through the lower mold cover 43 is aligned with mold cavity 45 when mold plate 44 is in its fill position as shown in FIGS. 1 and 3. A pair of spacers 47 mounted on housing 41 on opposite sides of mold plate 44 support a breather plate 48 which, with an upper cover plate 49, affords a top mold cover for the opposite side of mold plate 44 from the lower mold cover, fill plate 43. Breather plate 48 may have the usual minute air exhaust openings 51 and an air passage 52, in accordance with convention practice, to permit effective, rapid filling of mold cavity 45. The principal components, of mold station 40, as thus far described, are all held together by a plurality of bolts 54, as shown in FIGS. 1 and 2.

Molding station 40 also comprises a knock-out mechanism 60 which may include a pneumatic cylinder (not shown) mounted within a housing 61. Knock-out drive rods 62 project downwardly from housing 61 and carry a knock-out cup 63 that has essentially the same peripheral shape as the mold cavity 45; see FIG. 2. When mold plate 44 is driven outwardly of molding station 45 to its discharge position 44A as shown in FIG. 1, with the mold cavity at position 45A, the mold cavity is aligned with knock-out cup 63 so that a molded food product 65 can be discharged from the mold plate on to a take away conveyor 64.

As thus far described, molding station 40 is essentially conventional. If breather plate 48 and cover plate 49, together constituting the upper mold cover for the patty molding machine, were continuous across mold plate 44, the machine would be essentially the same as a conventional reciprocating mold plate patty molding machine. That is, a food product ingredient would be pumped, under pressure, into and through the pump cavity 42 by appropriate pump means (not shown). With mold plate 44 in the fill position shown in solid lines in FIG. 1, and also shown in FIG. 3, the pressurized food product would move upwardly through the first fill passage 46 into mold cavity 45, filling the mold cavity. With the mold cavity 45 filled with hamburger, fish, chicken, or other food product, mold plate 44 would be driven outwardly from station 40 to its discharge position 44A, FIG. 1, by appropriate mold plate drive means. Again, the drive means is not shown because it is well known in the art. Mold plate 44 ends up in its discharge position 44A (FIG. 1) with the mold cavity in position 45A immediately below knock-out cup 63. The knock-out cup and the mold cavity have the same shape and approximate size (see FIG. 2). When mold plate 44 is in its discharge position 45A, knock-out shafts 62 are driven downwardly so that cup 63 passes through the mold cavity and delivers the molded food patty 65 to take away conveyor 64.

The co-forming apparatus incorporated in molding station 40, constituting one embodiment of the present invention, includes a second fill passage 66 that extends through the upper mold cover comprising plates 48 and 49. This second fill passage 66 has a guide sleeve 67 constituting a liner for that part of the second fill passage which extends through mold cover plate 49. No guide sleeve is required in the portion of the passage that traverses breather plate 48. The second fill passage 66 is aligned with the central part of mold cavity 45 as explained below.

A tubular separator member 68 is movably mounted in the second fill passage 66; movement of the tubular separator 68 is vertical, in the illustrated molding station 40, the limits for movement of separator 68 being the full down fill position shown in FIG. 3 and the fully elevated discharge position shown in FIG. 4. In the fill position for separator 68, FIG. 3, the lower portion 69 projects down into mold cavity 45 to separate the inner part 72 of the mold cavity from a peripheral part 71.

At its upper end, separator member 68 constitutes a piston 73. This upper portion of separator member 68 is disposed in closely fitting relationship to a fixed central displacement member 74. Member 74 is suspended from the cover 75 of a piston cylinder or housing 76; cylinder 76 encompasses the tubular separator member 68. Appropriate seals are provided for piston 73 in housing 76, for cover 75 in housing 76, for the lower portion of separator member 68 with respect to housing 76, and in member 74 for piston 73.

The co-forming apparatus of the embodiment of the invention illustrated in FIGS. 1-4 further comprises a fill conduit 78 for a second food ingredient. Conduit 78 communicates with the second fill passage 66 when separator member 68 is in its fill position as shown in FIG. 3. Fill conduit 78 is connected to a secondary food ingredient pump 79 that is shown only schematically in the drawings. Pump 79, though illustrated as located on the cover plate 49, is usually positioned a short distance away from the molding machine comprising station 40 because the secondary pump is likely to require more space than available in the molding station. Another F-6 food patty molding may be used as pump 79.

The piston housing or cylinder 76 has two operating ports 81 and 82. Port 81 is located in cover 75 and communicates with the space 83 above piston 73. Port 82 is located in cylinder 76 and communicates with the space 84 below piston 73. Ports 81 and 82 are connected, by two conduits 85 and 86, respectively, to a solenoid-actuated control valve 87. Valve 87 is connected to a compressed air supply; the valve also has an exhaust connection.

Perhaps the best starting point for consideration of operation of the co-forming apparatus of molding station 40, FIGS. 1-4, is with mold plate 44 in its fill position, FIGS. 1-3. For this position of the mold plate, valve 87 has been actuated t the position shown with air supplied under pressure through conduit 85 and port 81 into the space 83 above piston 73. Port 82, conduit 86, and valve 87 vent cylinder space 84. As a consequent, piston 73 and tubular separator member 68 have been driven downwardly to the position shown in FIG. 3, in which the lower end 69 of separator member 68 effectively seals off the central part 72 of mold cavity 45 from the peripheral part 71 of the mold cavity.

With the system components in the fill positions shown in FIGS. 1-3, a first food ingredient (e.g. chicken) is pumped from pump cavity 42 upwardly through fill passage 46 into the peripheral part 71 of mold cavity 45. At the same time, a second food ingredient (e.g. cheese or stuffing) is pumped through fill conduit 78 and downwardly through the interior of the tubular separator member 68 in the second fill passage 66 into the central part 72 of mold cavity 45. As a consequence, mold cavity 45 is filled, under pressure, with the first food ingredient derived from the first fill passage 46 and with the second food ingredient that enters through the tubular separator in the second fill passage 66. During this filling operation, the lower end 69 of tubular separator 68 is maintained in its fill position, in which it extends through mold cavity 45 into contact with the upper surface of fill plate 43 and seals off the interior part 72 of the mold cavity from the exterior peripheral portion 71 of that cavity.

When both parts 71 and 72 of mold cavity 45 have been filled with the first and second food ingredients, respectively, which requires substantially less than 0.01 second in most instances, valve 87 is actuated to reverse the air and exhaust connections to ports 81 and 82 of cylinder 76. Thus, air is supplied under pressure to the space 84 below piston 73 and the space 83 above the piston is vented. As a consequence, piston 73 and separator member 68 are driven upwardly to the discharge position illustrated in FIG. 4, in which the lower end 69 of separator 68 is elevated at least to and preferably just slightly above the lower surface of breather plate 48. That is, in the discharge position for separator 68 its lower end 69 is clear of mold plate 44, a relationship illustrated in FIG. 4.

The annular void left by the retraction of the separator 68 is replaced with the second food ingredient by virtue of the displacement member 74. This member is the same diameter as the outside diameter of separator end 69, and the second food ingredient is displaced as the separator is raised.

As soon as separator 68 has been moved to its discharge position clear of mold plate 44 (FIG. 4), the drive for the mold plate is actuated to move the mold plate from its fill position to the discharge position 44A of FIG. 1. During this interval, the first and second fill passages 46 and 66 are effectively sealed off by mold plate 44. Although food ingredients remain present in fill passages 46 and 66, those food ingredients cannot flow anywhere because there is no cavity available to receive them. Thus, discharge of the molded food product 65 onto take away conveyor 64, FIG. 1, is carried out just as in the ordinary operation of the food product molding machine.

After the molded food product has been discharged from the mold cavity in plate 44, the mold plate is drawn back to its fill position and the molding cycle is repeated. That is, when mold plate 44 again reaches its fill position, mold cavity 45 is once more aligned with fill passages 46 and 66. At this juncture, valve 87 is actuated to again reverse the air connection so that, in cylinder 76, air pressure is applied in space 83 and space 84 is exhausted. This drives piston 73 downwardly, moving the tubular separator member 68 back to its fill position as shown in FIG. 3. In the process, the side openings 88 in tubular member 68 is brought into alignment with the annular groove 89 in cylinder 76 that is connected to fill conduit 78, so that an additional supply of the second food ingredient can enter the second fill passage 66, actually in the interior or separator member 68, from pump 79.

As will be apparent from the foregoing description, a number of variations in the co-forming apparatus of molding station 40 are possible without departing from the basic concept of the invention. In molding station 40, the first fill passage 46 is shown in a given location, communicating with only one side of the peripheral part 71 of mold cavity 45. The location, size, and orientation of the first fill passage may be modified as needed or desired to accommodate variations in size and configuration of the ingredients in the patty. In some machines it may even be desirable to have two or more first fill passages. In part, the considerations as to whether an additional first fill passage for the first ingredient should be provided are likely to depend upon the shape of the final food patty 65 (FIG. 5) and the configuration and size of the second ingredient 92 in that patty, as compared to the first ingredient 91.

In the illustrated embodiment of the invention, fill passages 46 and 66 extend through different mold covers for mold plate 44. That is, the first fill passage 46 extends upwardly through the fill plate or bottom mold cover 43. The second fill passage 66, with its hollow separator member 68, on the other hand, extends downwardly through cover plate 49 and breather plate 48. Of course, this relationship can be reversed so that the first fill passage, for filling the peripheral part 71 of mold cavity 45, extends downwardly through mold cover 49. Indeed, this is the arrangement for some reciprocating mold plate machines, in which the primary food ingredient is pumped downwardly into the mold cavity or cavities. When that expedient is adopted, breather plate 48 is preferably located below mold plate 44. Furthermore, the two fill passages can both be introduced from the same side of mold plate 44. They may both extend downwardly into the mold cavity or they may both extend upwardly into the mold cavity. A construction of this sort, however, complicates the overall construction of the co-forming apparatus and is not preferred. Of course, the drive for piston 73 may be pneumatic, hydraulic, or mechanical.

From the foregoing description, it will be apparent that the co-forming apparatus of the present invention, incorporated in the molding station of a reciprocating mold plate food patty molding machine, is capable of effective, efficient, high volume production of dual-ingredient food patties, with one ingredient nested within the other, like food patty 65 (FIG. 5). The conversion apparatus is relatively simple, entailing replacement of the bottom cover plate (fill plate 43), breather plate 48, and mold cover 49, in addition to cylinder 76 and separator 68 with its piston 73. For protection of tubular separator member 68, a proximity sensor 93 connected to the control system for the solenoid of valve 87 is desirable. The co-forming apparatus, as shown, can be effectively applied to any of the molding machines identified above and can be utilized with a variety of different food ingredients. Despite its simplicity and limited cost of construction, the apparatus is efficient and well adapted to long operational life.

I claim:

1. Co-forming apparatus for the molding station of a food patty molding machine of the kind comprising:

a mold plate, including a mold cavity, movable along a given path between a fill position, in which the opposite sides of the mold cavity are covered by first and second mold covers, and a discharge position, in which the mold cavity is clear of the mold covers;

mold plate drive means for cyclically driving the mold plate between its fill and discharge positions;

a first fill passage, through one of the mold covers, aligned with the mold cavity fill position;

and first pump means for pumping a first food ingredient through the first fill passage into a first part of the mold cavity;

the co-forming apparatus comprising:

a second fill passage, through one of the mold covers, aligned with the mold cavity fill position;

second pump means for pumping a second food ingredient through the second fill passage into a second part of the mold cavity;

a tubular separator member movably mounted in the second fill passage;

and separator drive means for driving the separator member between a separator fill position in which the separator extends into the mold cavity fill position and separates the second part of the mold cavity from the first part, and a separator discharge position in which the separator member is clear of the mold plate.

2. A co-forming apparatus for producing a dual ingredient food patty, according to claim 1, for a molding machine in which the first fill passage extends through the first mold cover;

and in which the second fill passage extends through the second mold cover.

3. A co-forming apparatus for producing a dual ingredient food patty, according to claim 2, in which the separator member fits closely into the second fill passage.

4. A co-forming apparatus for producing a dual ingredient food patty, according to claim 3, and further comprising a guide sleeve mounted in the second fill passage in close-fitting, encompassing relation to the separator member.

5. A co-forming apparatus for producing a dual ingredient food patty, according to claim 4, in which the tubular separator member is an extension of a fluid-pressure actuated piston comprising a part of the separator drive means.

6. A co-forming apparatus for producing a dual ingredient food patty, according to claim 5, in which the first mold cover includes a base plate positioned below the mold plate;

the first fill passage extends upwardly through the base plate;

the second mold cover includes an upper cover plate positioned above the mold plate; and the second fill passage extends downwardly through the upper cover plate.

7. A co-forming apparatus for producing a dual ingredient food patty, according to claim 6, and further comprising a breather plate interposed between the upper cover plate and the mold plate, the second fill passage extending downwardly through both the upper cover plate and the breather plate.

8. A co-forming apparatus for producing a dual ingredient food patty, according to claim 1, in which:

the first mold cover includes a lower cover plate positioned below the mold plate;

the second mold cover includes an upper cover plate positioned above the mold plate;

one mold cover includes a breather plate interposed between one cover plate and the mold plate; and the first fill passage extends through the cover plate on the opposite side of the mold plate from the breather plate.

9. A co-forming apparatus for producing a dual ingredient food patty, according to claim 8, in which the first part of the mold cavity is at least as large as and encompasses the second part of the mold cavity.

10. A co-forming apparatus for producing a dual ingredient food patty, according to claim 9, in which:

the first part of the mold cavity is larger than the second part of the mold cavity.

11. A co-forming apparatus for producing a dual ingredient food patty, according to claim 10, in which the first fill passage extends through the lower cover plate.

12. A co-forming apparatus for producing a dual ingredient food patty, according to claim 1, in which the separator member fits closely into the second fill passage.

13. A co-forming apparatus for producing a dual ingredient food patty, according to claim 1, and further comprising a guide sleeve mounted in the second fill passage in close-fitting, encompassing relation to the separator member.

14. A co-forming apparatus for producing a dual ingredient food patty, according to claim 1, in which the tubular separator member is an extension of a fluid-pressure actuated piston comprising a part of the separator drive means.

15. A co-forming apparatus for producing a dual ingredient food patty, according to claim 1, in which the first mold cover includes a base plate positioned below the mold plate;

the first fill passage extends upwardly through the base plate;

the second mold cover includes an upper cover plate positioned above the mold plate; and the second fill passage extends downwardly through the upper cover plate.

16. A co-forming apparatus for producing a dual ingredient food patty, according to claim 15, and further comprising a breather plate interposed between the upper cover plate and the mold plate, the second fill passage extending downwardly through both the upper cover plate and the breather plate.

17. A co-forming apparatus for producing a dual ingredient food patty, according to claim 1, in which both fill passages extend through the same mold cover.

* * * * *